United States Patent Office 3,247,908
Patented Apr. 26, 1966

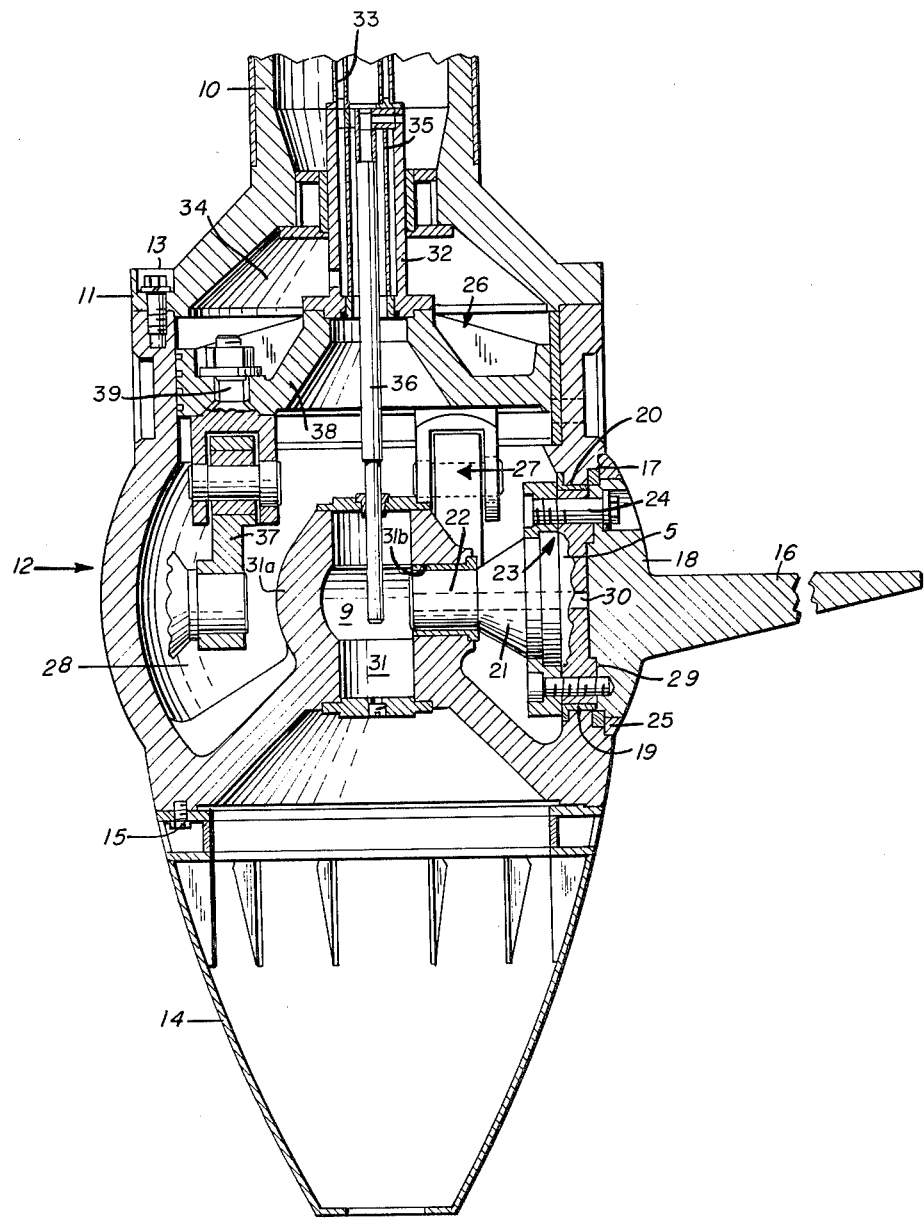

3,247,908
ADJUSTABLE BLADES HYDRAULIC TURBINE RUNNER
Nicolay Nikolaevich Robook, Ulitsa Svobodnoy Akademii 9, Appart. 57, and Victor Nicolaevich Roodenko, Osnovianskaia Ulitsa 76, both of Kharkov, U.S.S.R., and Lev Nicolaevich Petrov, Nevsky Prospect 22/24, Appart. 24, Serguey Fomich Boodnikov, Ulitsa Guerasi Movskaia 12, Appart. 21, and Oleg Semionovich Babanov, Ulitsa Ulianova 12, Appart. 9, all of Leningrad, U.S.S.R.
Filed Aug. 27, 1962, Ser. No. 222,986
2 Claims. (Cl. 170—160.32)

This invention relates to hydraulic turbines and, more particularly, to runners for the adjustable blades of such turbines.

At the present time, known runners for adjustable blades of hydraulic turbines are generally provided with a servo motor for actuating the mechanism for adjusting the blades. The lower space or chamber for the servo-motor and the space for the adjusting mechanism for the blades are separated either by a diaphragm or by the cylinder wall of the servo-motor. The first situation pertains to runners embodying a cross-head or a cylindrical lug, while the second to runners provided with a servo-motor having a differential piston.

The structural details of such runners, the problems respecting the machining thereof and their assembly are quite complex, and the salient object of the present invention is to overcome the above problems by simplifying the runner structure and its production.

A further object of the invention is to provide a runner for the adjustable blade of hydraulic turbines which requires less metal and in which the overall size of the hub is decreased thereby assuring an increase in the specific speed and efficiency of the turbine.

To achieve the above and other objects, the invention comprehends a new concept in runners in that the lower space or chamber of the servo-motor located within the runner hub and the space for the blade actuating mechanism are constituted by a single space or chamber.

Further objects and advantages of the invention will become more readily apparent to one skilled in the art from the following detailed description and annexed drawing in which the single figure is a fragmentary longitudinal sectional view, partly in elevation, of a hydraulic turbine embodying the present invention.

Referring to the drawing, there is illustrated one end of a hydraulic turbine including a rotatable hollow main shaft 10 provided with an annular flange 11 to which a runner hub 12 is secured as shown at 13. A cap 14 is suitably secured to the other end of the hub as indicated at 15.

A plurality of blades 16, only one of which is illustrated, are rotatably mounted in the runner hub. More specifically, the hub 12 is formed with a circular recess 17 for each blade and the root end of the blade is flared as disclosed at 18. A circular journal 19 is rotatably supported on bearing surface 20 of the recess 17 and frusto-conical portion 21 of stub shaft 22 is held against the inner face of the journal 19 by ring member 23.

The flared end 18, journal 19 and ring member 23 are secured together by bolts or the like 24. Sealing means 25 is located between the periphery of the flared end 18 of the blade and the recess 17 of the runner hub.

A servo-motor 26 is positioned within the upper end of the runner hub 12 and blade adjusting mechanism 27 operably connects the servo-motor to the blades for adjusting the blades. It will be noted that the lower space for the servo-motor 26 and the space for the blade adjusting mechanism 27 are defined by a single space or chamber 28.

The outer face of each journal 19 is provided with radially disposed grooves 29 which communicate with an axial bore 30 provided in the journal 19, frusto-conical portion 21 and shaft 22, respectively. The other end of the bore 30 leads to a drainage chamber 31 defined by wall means 31a provided within the chamber 28 of the runner hub 12. The wall means 31a is also provided with apertures 31b for receiving the stub shafts 22. The function of the grooves 29 and the axial bore 30 will later be more fully described.

A sleeve 32 is carried by the servo-motor piston and support conduit means 33 for introducing fluid into chamber 34 of the servo-motor. Conduit means 35 is also supported by the sleeve 34 and communicates with the chamber 28 while conduit 36 mounted axially of the sleeve leads to the drainage chamber 31 and the interior of the shaft 10. Suitable control valves can be provided for the conduit means 33 and 35.

The blade adjusting mechanism includes a crank 37 which is directly connected to the bottom of piston 38 of the servo-motor as indicated at 39, and to the shaft of the blade 16 as is clearly apparent from the drawing.

The grooves 29 and axial bore 30 serve to relieve the sealing means 25 of increased internal oil pressure. More particularly, the fluid in space or chamber 28 which is under considerable pressure and which due to the turning of the blades 16 may pass through the journal is led via the radial grooves 29 and bore 30 into the drainage chamber 31. From the chamber 31, the fluid can pass through the conduit 36 into the interior of the shaft 10.

The invention is not to be confined to any strict conformity to the showings in the drawings, but changes or modifications may be made therein so long as such changes or modifications mark no material departure from the spirit and scope of the appended claims.

What we claim is:

1. In a hydraulic turbine, a hollow main shaft, a runner hub carried by said main shaft, a plurality of blades, means journalling each blade for rotation in said hub, sealing means for each blade journalling means, a servo-motor mounted in the upper end of said hub, said hub having a single chamber below said servo-motor, mechanism directly connected to the bottom of said servo-motor and to said blade journalling means for adjusting the position of said blades, said blade journalling means having radial passages and an axial bore, wall means within the single chamber of said hub providing a drainage chamber with which said axial bore communicates for receiving any fluid passing from said single chamber through said blade journalling means for relieving said sealing means from the fluid pressure arising in said single chamber, conduit means supported by the servo-motor and extending therefrom axially of the main shaft for supplying fluid above the servo-motor, and second conduit means mounted axially of said first conduit means and extending into said drainage chamber.

2. The hydraulic turbine as claimed in claim 1, in which said blade journalling means includes a flared end on said blade, said runner hub having a recess for receiving said flared end, a bearing surface for said recess, a journal rotatably mounted on said bearing surface, a stub shaft and means connecting said journal, stub shaft and flared end, said radial passages being provided in one face of said journal and said bore being provided in said stub shaft.

References Cited by the Examiner

UNITED STATES PATENTS

| | | | |
|---|---|---|---|
| 1,510,086 | 9/1924 | Englesson | 170—160.32 |
| 2,527,112 | 10/1950 | Willis | 170—160.32 |
| 2,636,714 | 4/1953 | Willi | 170—160.23 |
| 2,794,508 | 6/1957 | Pehrsson | 170—160.32 |
| 2,870,848 | 1/1959 | Liaaen | 170—160.46 X |
| 3,051,248 | 8/1962 | Hatcher | 170—160.32 |

FOREIGN PATENTS

| | | |
|---|---|---|
| 702,047 | 1/1941 | Germany. |
| 248,140 | 1/1948 | Switzerland. |
| 272,376 | 3/1951 | Switzerland. |

SAMUEL LEVINE, *Primary Examiner.*

ABRAM BLUM, JULIUS E. WEST, *Examiner.*